(12) United States Patent
Search et al.

(10) Patent No.: US 10,259,619 B2
(45) Date of Patent: *Apr. 16, 2019

(54) QUICK CONNECT COUPLING DEVICE FOR A HOSE AND A QUICK CONNECT CAP FOR BOTTLE OR OTHER VESSEL

(71) Applicants: Collin Danis Search, Kennett Square, PA (US); John Danis Search, Kennett Square, PA (US)

(72) Inventors: Collin Danis Search, Kennett Square, PA (US); John Danis Search, Kennett Square, PA (US)

(*) Notice: Subject to any disclaimer, the term of this patent is extended or adjusted under 35 U.S.C. 154(b) by 89 days.

This patent is subject to a terminal disclaimer.

(21) Appl. No.: 15/427,749

(22) Filed: Feb. 8, 2017

(65) Prior Publication Data
US 2018/0224039 A1    Aug. 9, 2018

(51) Int. Cl.
| | |
|---|---|
| *F16L 37/48* | (2006.01) |
| *B65D 41/04* | (2006.01) |
| *B65D 45/34* | (2006.01) |
| *B65D 53/02* | (2006.01) |
| *F16L 37/20* | (2006.01) |
| *F16L 55/115* | (2006.01) |
| *F16L 15/00* | (2006.01) |
| *F16L 33/34* | (2006.01) |

(52) U.S. Cl.
CPC ..... *B65D 41/0485* (2013.01); *B65D 41/0428* (2013.01); *B65D 41/0478* (2013.01); *B65D 45/345* (2013.01); *B65D 53/02* (2013.01); *F16L 37/20* (2013.01); *F16L 37/48* (2013.01); *F16L 55/1157* (2013.01); *F16L 15/006* (2013.01); *F16L 33/34* (2013.01)

(58) Field of Classification Search
CPC ........... F16L 33/32; F16L 37/05; F16L 37/48; B65D 41/0485
See application file for complete search history.

(56) References Cited

U.S. PATENT DOCUMENTS

| | | | |
|---|---|---|---|
| 1,971,438 A * | 8/1934 | Yoder ...................... | F16L 33/12 16/DIG. 33 |
| 2,449,920 A * | 9/1948 | Williams .............. | E03C 1/0404 285/305 |
| 2,494,774 A * | 1/1950 | Messick .................. | F16L 37/16 285/308 |
| 4,443,028 A | 4/1984 | Hayes | |

(Continued)

*Primary Examiner* — Shawn M Braden
(74) *Attorney, Agent, or Firm* — Caesar Rivise, PC

(57) ABSTRACT

A coupling device for mounting onto the spout of a faucet is disclosed. The device is connected or connectable to a hose and includes an elastomeric sleeve and a clamp assembly. The clamp assembly includes a housing and a pressure applying member. The housing has a cavity holding the sleeve between a back wall and the pressure applying member. The sleeve receives the externally threaded spout. The pressure applying member is movable to a closed position to compress the sleeve tightly about the spout to releasably secure the device to the faucet. The pressure applying member is also movable to an open position to release the spout from the sleeve. Also disclosed is a cap device for releasably sealing an externally threaded mouth of a bottle or other hollow vessel and making use of an elastomeric sleeve and a clamp assembly similar in many respects to the coupling device.

10 Claims, 10 Drawing Sheets

(56) References Cited

U.S. PATENT DOCUMENTS

| | | | |
|---|---|---|---|
| 4,660,803 A | | 4/1987 | Johnston et al. |
| 5,028,077 A | * | 7/1991 | Hurst ............... F16L 27/107 |
| | | | 285/252 |
| 5,503,437 A | | 4/1996 | Cronley |
| 5,649,723 A | | 7/1997 | Larsson |
| 6,325,425 B1 | | 12/2001 | Kierath et al. |
| 6,431,217 B2 | * | 8/2002 | Robinson ............ A47L 11/30 |
| | | | 138/109 |
| 6,685,229 B2 | * | 2/2004 | Morrison ............ F16L 33/02 |
| | | | 285/23 |
| 6,786,516 B2 | | 9/2004 | Cronley |
| 7,140,645 B2 | | 11/2006 | Cronley |
| 7,174,921 B1 | * | 2/2007 | Wiltse ............... F16L 33/12 |
| | | | 138/109 |
| 7,270,350 B2 | | 9/2007 | Cronley |
| 8,070,188 B2 | | 12/2011 | Cronley |

\* cited by examiner

QUICK CONNECT COUPLING DEVICE FOR A HOSE AND A QUICK CONNECT CAP FOR BOTTLE OR OTHER VESSEL

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

FIELD OF THE INVENTION

This invention relates generally to couplings for hoses and more particularly to quick connect coupling devices for garden hoses and other types of hoses and caps including quick connect means for releasably sealing bottles or other hollow vessels.

Numerous couplers or connectors for connecting the end of a hose, such as a garden hose, to an externally threaded or un-threaded bib or spout of a faucet are commercially available. For example, many prior art hoses include connectors in the form of an internally threaded female component secured to the end of the hose and which female member is adapted to be screwed onto the externally threaded spout of the faucet. Such a connector is typically made of a metal, e.g., brass, which will not corrode when the connector is left out of doors and subjected to the ambient weather. One particular drawback of such a connector is that it may be somewhat difficult to connect to the externally threaded spout of the faucet by persons having limited manual dexterity, e.g., aged or infirm persons suffering from arthritis or other conditions which make it difficult to screw the connectors together. Another drawback of such prior art connectors is that they typically require use of a resilient material washer or gasket to form a water-tight interface between the connector and the threaded spout of the faucet when the connector is screwed thereon. Such washers wear out or are lost, thereby subjecting the connection to water leakage at the interface. Other disadvantages prior art is comprised of multiple pieces that may get separated, lost or broken rendering the connector useless.

Various quick connect couplers have been disclosed in the patent literature to enable the quick coupling of a hose to the spout of a faucet to overcome some of the disadvantages of the prior art. Examples of such devices are shown in U.S. Pat. No. 4,443,028 (Hayes), U.S. Pat. No. 4,660,803 (Johnston et al.), U.S. Pat. No. 5,503,437 (Cronley), U.S. Pat. No. 5,649,723 (Larsson), U.S. Pat. No. 6,325,425 (Kierath et al.), U.S. Pat. No. 6,786,516 (Cronley), and U.S. Pat. No. 7,270,350 (Cronley).

While the above identified prior art may be suitable for their intended purposes, they still leave something to be desired from one or more of the following aspects, simplicity of construction, cost, and ease of use. Thus, a need exists for a coupling device which overcomes the disadvantages of the prior art.

The subject invention addresses that need by providing a coupling device for use with a faucet, hose valve, or bib having an externally threaded spout to releasably connect a garden or other hose thereto and which overcomes the disadvantages of the prior art. In addition, the subject invention makes use of the features of the coupling device with a cover member to provide a cap for a bottle or other hollow vessel having an externally threaded mouth for sealing that bottle or vessel.

SUMMARY OF THE INVENTION

In accordance with one aspect of this invention a coupling device is provided for releasably securing a hose to a faucet having a free end. The coupling device basically comprises an elastomeric sleeve and a clamp assembly. The elastomeric sleeve has a central passageway configured for receipt of the free end of the faucet. The clamp assembly comprises a housing and a pressure applying member. The housing has a cavity including a backing wall having a concave interior surface. The cavity is configured for receipt of the elastomeric sleeve, wherein a portion of the elastomeric sleeve abuts the concave interior surface of the backing wall. The pressure applying member is movably connected to the housing and located generally opposite the concave interior surface of the backing wall. The pressure applying member is movable between an open position and a closed position, and vice versa. The pressure applying member has a concave interior surface configured to engage an external portion of the elastomeric sleeve to compress the elastomeric sleeve between it and the concave interior surface of the backing wall to cause the elastomeric sleeve to tightly engage the free end of the faucet when the pressure applying member is in the closed position to thereby releasably secure the clamp assembly to the faucet.

In accordance with another aspect of this invention the hose is fixedly secured to the coupling device, whereas in an alternative preferred aspect of the invention the hose is releasably secured to the coupling device. In the alternative preferred aspect of the invention the hose may include an externally threaded connector and wherein the coupling device additionally comprises an internally threaded connector for releasable receipt of the externally threaded connector of the hose.

In accordance with another aspect of this invention the pressure applying member is pivotable and the clamp assembly additionally comprises a lever for pivoting the pressure applying member from the open position to the closed position, and vice versa.

In accordance with another aspect of this invention the clamp assembly comprises an over-center assembly configured to hold the pressure applying member in the position against accidental movement to the open position.

In accordance with another aspect of this invention the free end of the faucet includes external threads wherein the elastomeric sleeve tightly engages the free end of the faucet when the pressure applying member is in the closed position.

In accordance with another aspect of this invention a cap for releasably closing a hollow vessel having an externally threaded mouth is provided. The cap comprises an elastomeric sleeve and a clamp assembly. The elastomeric sleeve has a passageway configured for receipt of the externally threaded mouth of the vessel. The clamp assembly comprises a housing and a pressure applying member. The housing has a cavity including a cover and a backing wall. The backing wall has a concave interior surface. The cavity is configured for receipt of the elastomeric sleeve, wherein a portion of the elastomeric sleeve abuts the concave interior surface of the backing wall, with the cover disposed over the elastomeric sleeve. The pressure applying member is connected to the housing and located generally opposite the concave interior surface of the backing wall. The pressure applying member is movable between an open position and a closed position, and vice versa. The pressure applying member has a concave interior surface configured to engage an external portion of the elastomeric sleeve to compress the elastomeric sleeve between it and the concave interior surface of the backing wall to cause the elastomeric sleeve to tightly engage the externally threaded mouth of the vessel when the pressure applying member is in the closed position to thereby releasably secure the clamp assembly to the vessel with the cover sealing the mouth of the vessel.

BRIEF DESCRIPTION OF THE DRAWING FIGURES

DETAILED DESCRIPTION OF THE PREFERRED EMBODIMENTS

Figure 1:
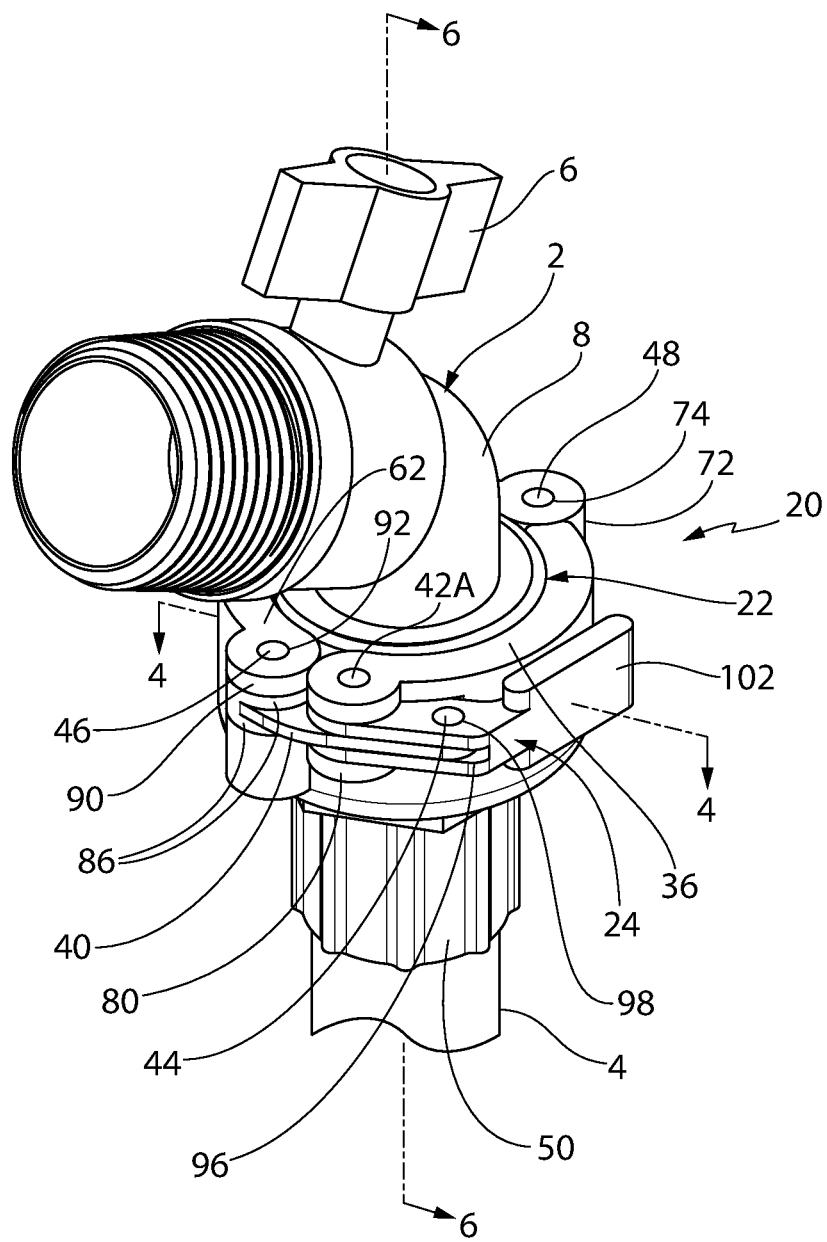
FIG. 1 is an isometric view of one exemplary embodiment of a coupling device constructed in accordance with this invention mounted onto an externally threaded bib or spout of a faucet to releasably secure a hose, e.g., a garden hose, thereto.
Figure 2:
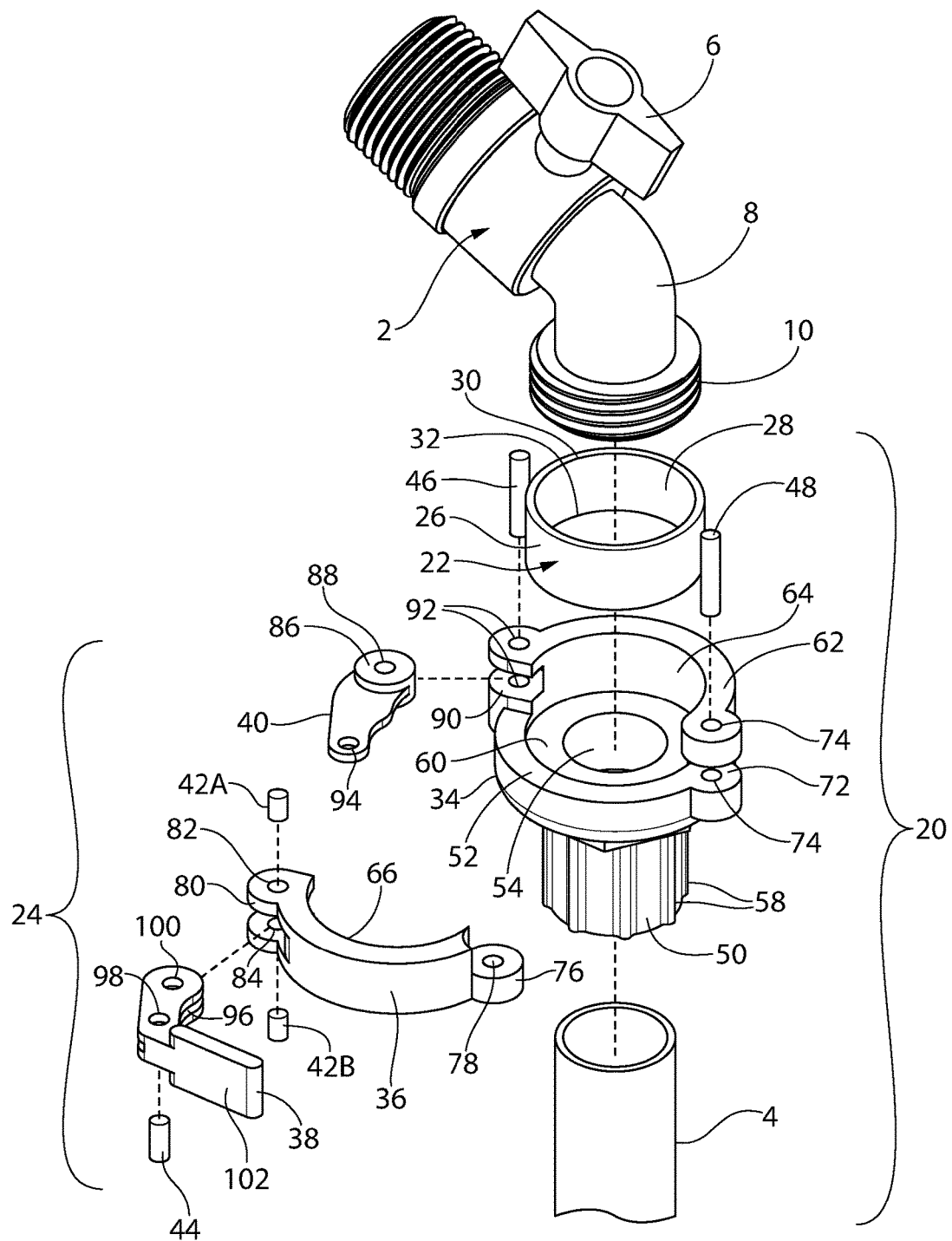
FIG. 2 is an isometric view, similar to FIG. 1, but showing the components making up the coupling device exploded.

Referring now to the various figures of the drawings wherein like characters refer to like parts there is shown in FIG. 1 one exemplary embodiment of a coupling device 20 constructed in accordance with this invention. The coupling device 20 is configured to be releasably connected to a hose hydrant, hose bib, tap or faucet 2 (all collectively referred to hereinafter as a "faucet") for carrying a liquid to which a hose 4 or other conduit is to be releasably secured. The faucet 2 shown in FIG. 1 is exemplary of a multitude of externally threaded devices to which the subject invention can be connected. However, it should be noted that the subject invention is suitable for releasable connection (mounting) to a hose hydrant, hose bib, tap or faucet whose free end is not externally threaded, e.g., is smooth. The exemplary faucet 2 includes a handle or knob 6 which is arranged to be turned twisted by a user to open or shut an internally located valve (not shown) in the faucet to enable or halt the flow of water (or any other liquid) from the faucet. The faucet includes a free end in the form of a bib or spout 8 which is externally threaded at 10 (FIG. 2). As will be seen from the discussion to follow the coupling device 20 is a quick-connect device that is configured to be readily releasably secured to the free end of the spout 8 by anyone, irrespective of their manual dexterity or ability to grasp, and without requiring the coupling device to be screwed onto the spout. Moreover, the nature of the interconnection between the coupling device 20 and the spout 8 renders it leak-proof, such that liquid can be carried from the spout into the coupling device to the hose without any leakage out of the coupling device.

Figure 7:
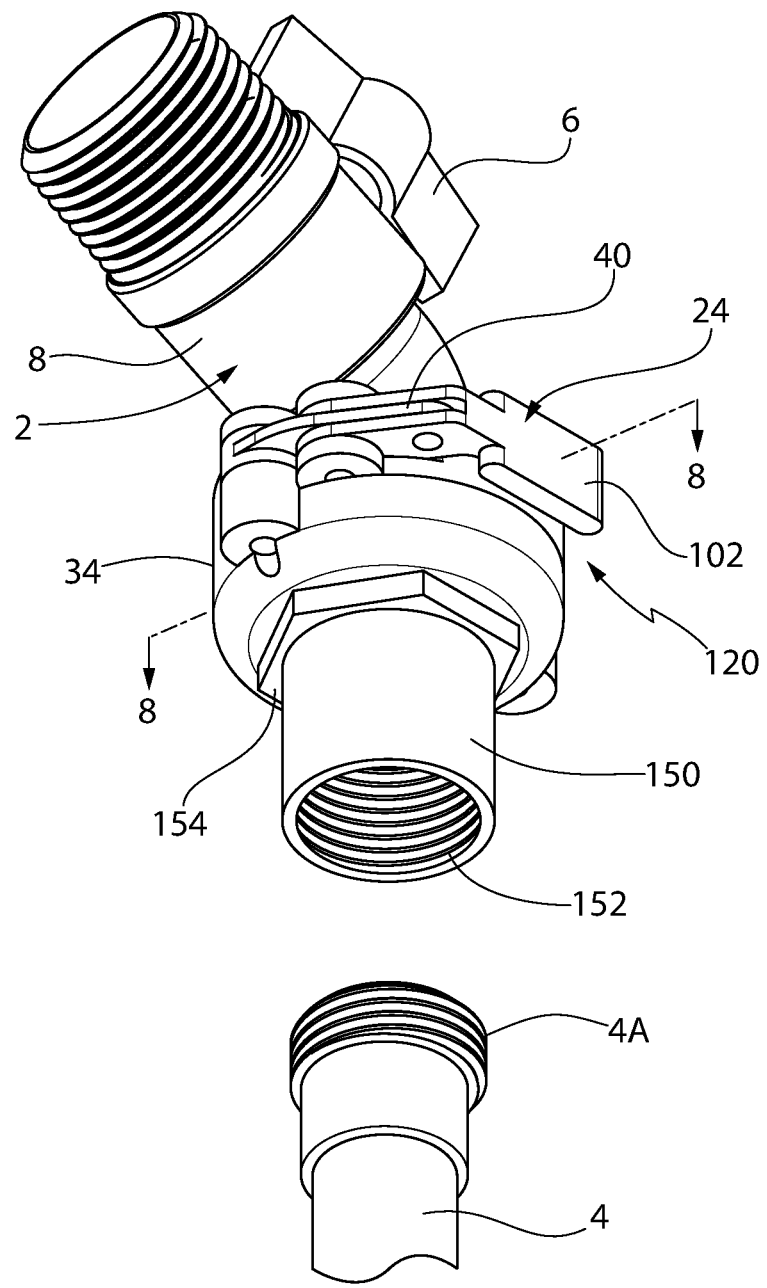
FIG. 7 is an isometric view of another exemplary embodiment of a coupling device constructed in accordance with this invention mounted onto an externally threaded bib or spout of a faucet to releasably secure a hose, e.g., a garden hose, thereto.
Figure 8:
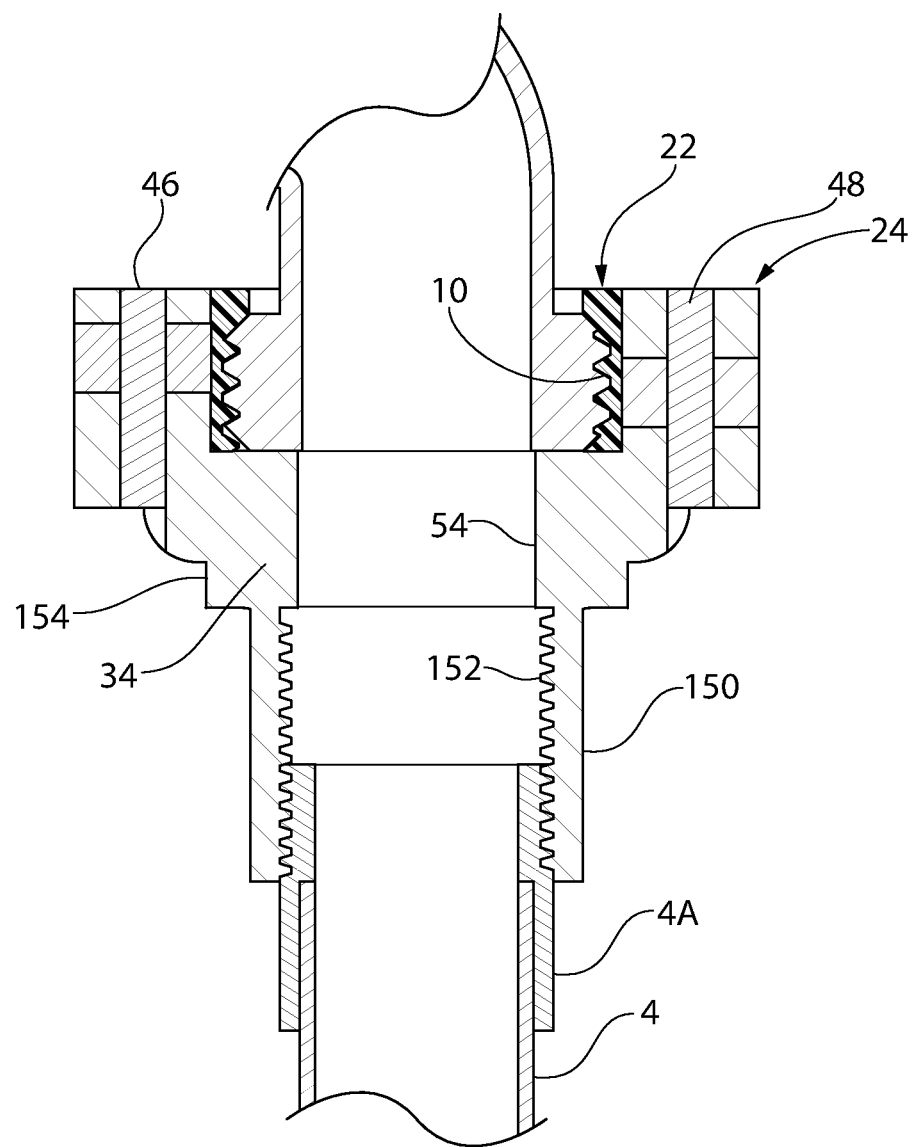
FIG. 8 is an enlarged sectional view taken along line 8-8 of FIG. 7.

The coupling device 20 is best seen in FIG. 2 and basically comprises an elastomeric sleeve 22 and a clamp assembly 24. The coupling device 20 forms a portion of the hose 4, i.e., it is fixedly secured to one end of the hose, i.e., the hose is specially constructed to include the coupling device 20. It should be noted at this juncture that the subject invention also entails a coupling device that is a stand-alone unit which can be releasably secured to a conventional hose. Thus, for example, as will be described in detail later, a coupling device constructed in accordance with this invention, may include a threaded socket for receipt of a male externally threaded connector of a conventional hose. That alternative, stand-alone, coupling device is shown in FIGS. 7 and 8, and is designated by the reference number 120. It will be described in detail later. Suffice it for now to state that both embodiments 20 and 120 of the invention make use of the same elastomeric sleeve and clamp assembly, except for some slight differences that will be described later.

Thus as can be seen in FIGS. 1-6, the elastomeric sleeve is a short tubular member formed of any suitable resilient material, e.g., rubber, etc. The sleeve 22 has a circular sidewall 26 bounding a central passageway 28 extending through it from its planar top end 30 to its planar bottom end 32. The inner diameter of the passageway 28 is just slightly greater than the outer diameter of the external threads 10 of the faucet's spout 8 to enable that portion of the spout to be freely inserted therein. The length of the passageway 28 of the sleeve 22 is preferably at least as long as the length of the externally threaded portion of the spout.

The clamp assembly 24 basically comprises a housing 34, a pressure applying member 36, a lever 38, a link 40 and plural pivot pins 42A, 42B, 44, 46 and 48. The housing 34 is an integral unit formed of any suitable material, e.g., a rugged, strong plastic material, but can be metal. The housing includes a bottom section 50 and a top section 52. The bottom section 50 is in the form of a hollow collar having a central passageway 54 (FIG. 6) including an annular recess 56 in which an end of the hose 4 is fixedly secured, e.g., adhesively secured. The outer surface of the collar includes a plurality of longitudinally extending ribs 58 to make the collar easy to grasp by a user. The top section 52 of the housing includes a circular cavity 60 including a backing wall 62 having a concave interior surface 64 in the form of an arc of a circle having a predetermined radius of curvature. The height of the backing wall 62 is approximately the height of the elastomeric sleeve 22. The cavity 60 is configured for receipt of the elastomeric sleeve 22, wherein the planar bottom edge 32 of the sleeve is disposed on the bottom of the cavity, with a portion of the exterior surface of the sleeve abutting the concave interior surface 64 of the backing wall. The sleeve is preferably fixedly secured in a cavity 60, but need not be fixedly secured, so long as it is resident within the cavity. In any case, with the sleeve 22 disposed within the cavity 60 the central passageway 54 in the housing 34 will be in fluid communication with the central passageway 28 in the sleeve.

Figure 4:
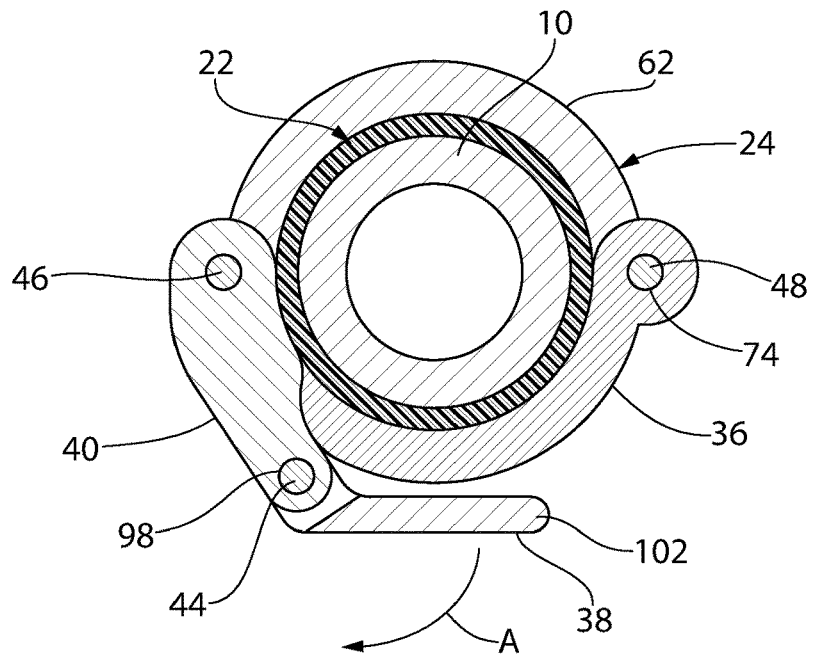
FIG. 4 is an enlarged sectional view taken along line 4-4 of FIG. 1.
Figure 5:
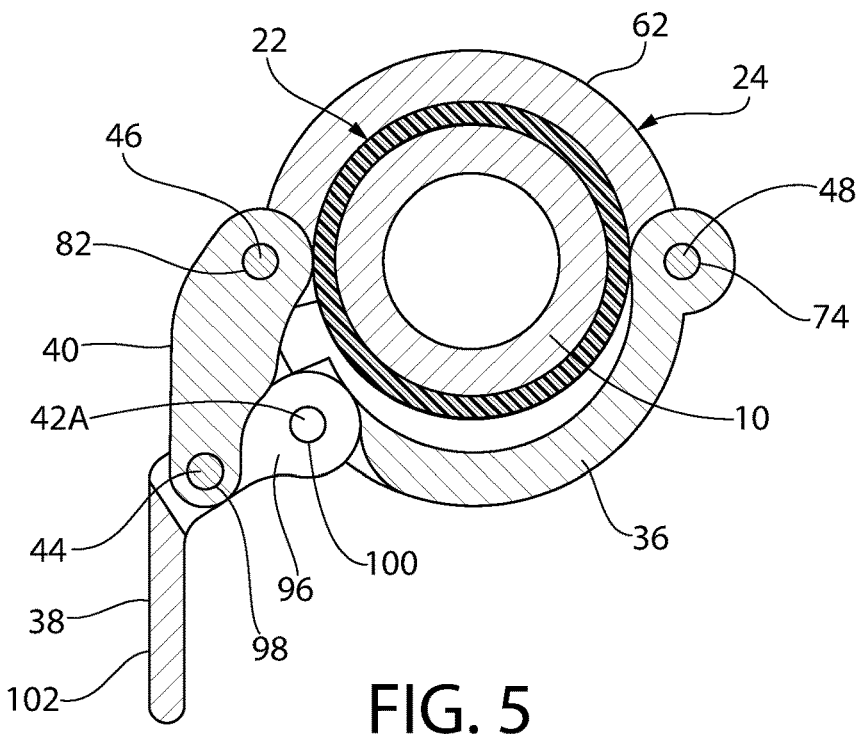
FIG. 5 is an enlarged sectional view similar to that of FIG. 4, but showing the coupling device in its opened state ready to be mounted onto the externally threaded bib or spout of a faucet.
Figure 6:
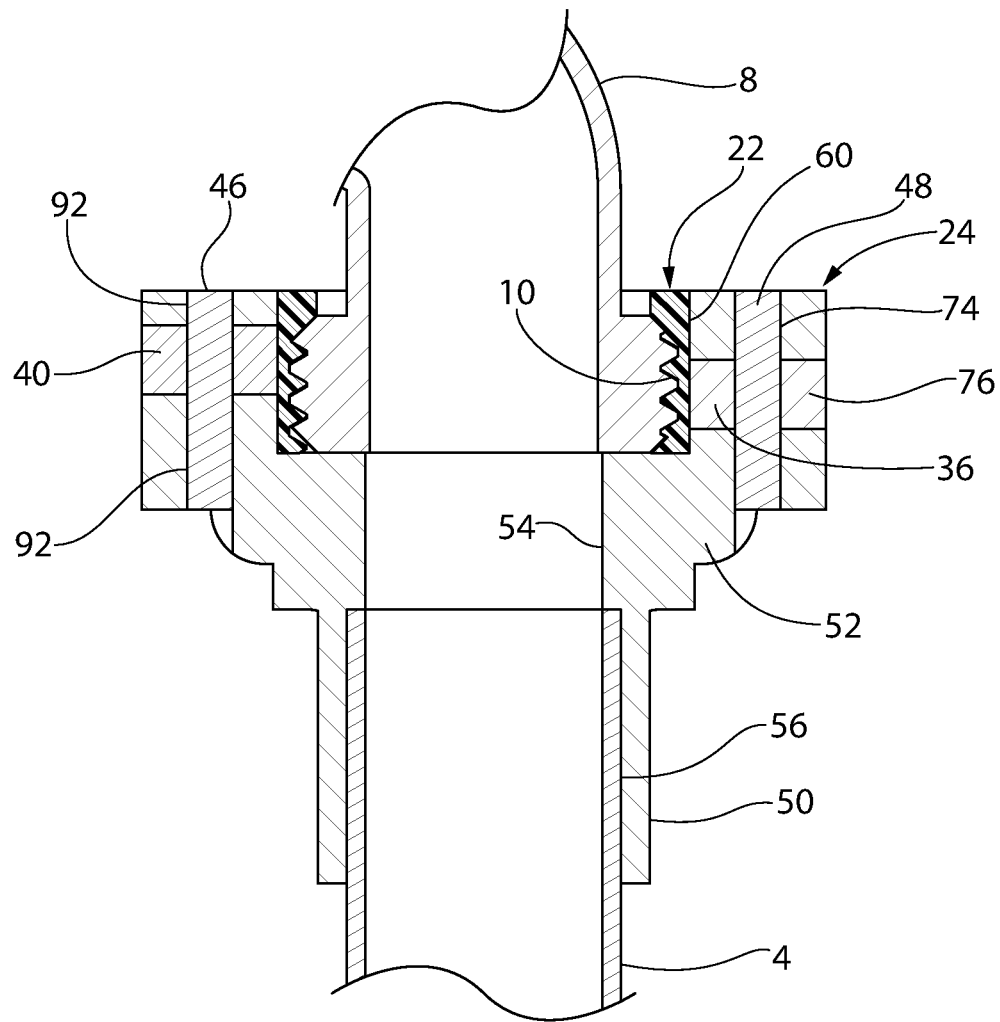
FIG. 6 is an enlarged sectional view taken along line 6-6 of FIG. 1.

The pressure applying member 36 is movably, e.g., pivotably, connected to the housing 34 and located generally opposite the concave interior surface 64 of the backing wall 62. The pressure applying member 36 includes a concave interior surface 66 having a radius of curvature approximately the same as the radius of curvature of concave interior surface 64 of the backing wall. The pressure applying member 36 is movable, e.g., pivotable, between an open position (shown in FIG. 5) and a closed position (shown in FIG. 4), and vice versa, as will be described later. Suffice it for now to state that the concave interior surface 66 of the pressure applying member 36 is configured to engage an external portion of the sleeve 22 to compress the sleeve between it and the concave interior surface 64 of the backing wall 62 to compress the sleeve and cause it to tightly engage the externally threaded portion 10 of the spout of the faucet when that portion of the spout is located within the elastomeric sleeve and the pressure applying member is in the closed position. That action releasably secures the clamp assembly to the faucet and enables the threads of the threaded portion of the faucet's spout to dig into the elastomeric material making up the sleeve, thereby forming a good fluid-tight interface therebetween, such as shown in FIGS. 4 and 6.

When the pressure applying member 36 is pivoted to the open position, as will also be described later, its concave interior surface 66 will be brought out of engagement with the portion of the elastomeric sleeve disposed opposite the backing wall 62. That action enables the elastomeric sleeve to expand radially outward to its normal and uncompressed state, whereupon the external threads 10 of the spout will be freed from the interior surface of the sleeve so that the clamp assembly and the sleeve can be removed as a unit from the faucet.

The movement or pivoting of the pressure applying member 36 from its open position to its closed position and vice versa is accomplished via the lever 38, the link 40 and the pivot pins 42-48 being coupled together to form an "over-center" clamp arrangement. In particular, one end of the backing wall 62 includes a yoke 72. The yoke 72 includes a pair of axially aligned holes 74. The outer end of the pressure applying member 36 includes an ear 76 projecting outward therefrom. The ear includes a hole 78 which is configured to be axially aligned with the holes 74 when the ear 76 is located within the yoke 72. This arrangement pivotably connects the outer end of the pressure applying member to the housing. The inner end of the pivotable member 36 is in the form of a yoke 80. The yoke 80 includes a pair of axially aligned holes 82 and 84. The link 40 includes an inner end in the form of a pair of oppositely disposed raised bosses 86 having a hole 88 extending therethrough. The inner end of the link is configured to be disposed within a yoke 90 at the opposite end of the backing wall 52. The yoke 90 includes a pair of axially aligned holes 92 which align with the hole 88 in the inner end portion of the link 40 when the bosses of the link are within the yoke 90. The pivot pin 46 extends through those aligned holes to pivotably connect the inner end of the link 40 to the yoke 90. The opposite or outer end of the link 40 includes a hole 94. The lever 38 includes a yoke-like body portion 96 having a first pair of axially aligned holes 98 extending therethrough at approximately the middle of the lever 38 and a second pair of axially aligned holes 100 extending therethrough adjacent the inner end of the body portion 96. The outer end of the link 40 is disposed within the yoke-like body portion 96 of the lever 38, with hole 94 of the link being axially aligned with the first pair of holes 98 and with the pivot pin 44 extending through the aligned holes 94 and 98. That action pivotably connects the outer end of the link to the middle of the lever. The yoke-like portion 96 of the lever is itself located within the yoke 80 of the pressure applying member 36 such that the holes 82, 84 and 100 are axially aligned. The pivot pin 42A extends through one of the pair of holes 100 and the axially aligned hole 82. In a similar manner, the pivot pin 42B extends through the other of the pair of the holes 100 and the axially aligned hole 84. This action pivotably connects the end of the lever opposite the handle 102 to the yoke 80 of the pressure applying member 36. The outer end of the link 40 is configured to be located within the yoke 90 at the inner end of the backing wall 62 and pivotably connected thereto by the pivot pin extending through the aligned holes 92, 88 and 92.

Accordingly, the pivotable connection of the lever 38 and the link 40 to the pressure applying member 36 and the pivotable connection of the link 40 to the backing wall 62 of the housing 34 establish an "over-center" clamp arrangement. As such, when the lever 38 is pivoted in the clockwise direction, like shown by the curved arrow A in FIG. 3, the clamping member 36 will be pivoted to its opened position. Conversely, when the lever 38 is pivoted in the opposite (counter-clockwise) direction, that action pivots the clamping member 36 about the axis of the pin 48 to the closed position, like shown in FIGS. 1 and 4. In that position, the clamping member compresses the sleeve 22 into intimate engagement with the threads of the spout, as described above. Moreover, the over-center nature of the clamp assembly assures that when the clamp assembly is in the closed position or state that it remains in that position or state and is resistant to accidental opening. It is only upon the purposeful pivoting of the lever in the clockwise direction that the clamp assembly is opened.

Figure 3:
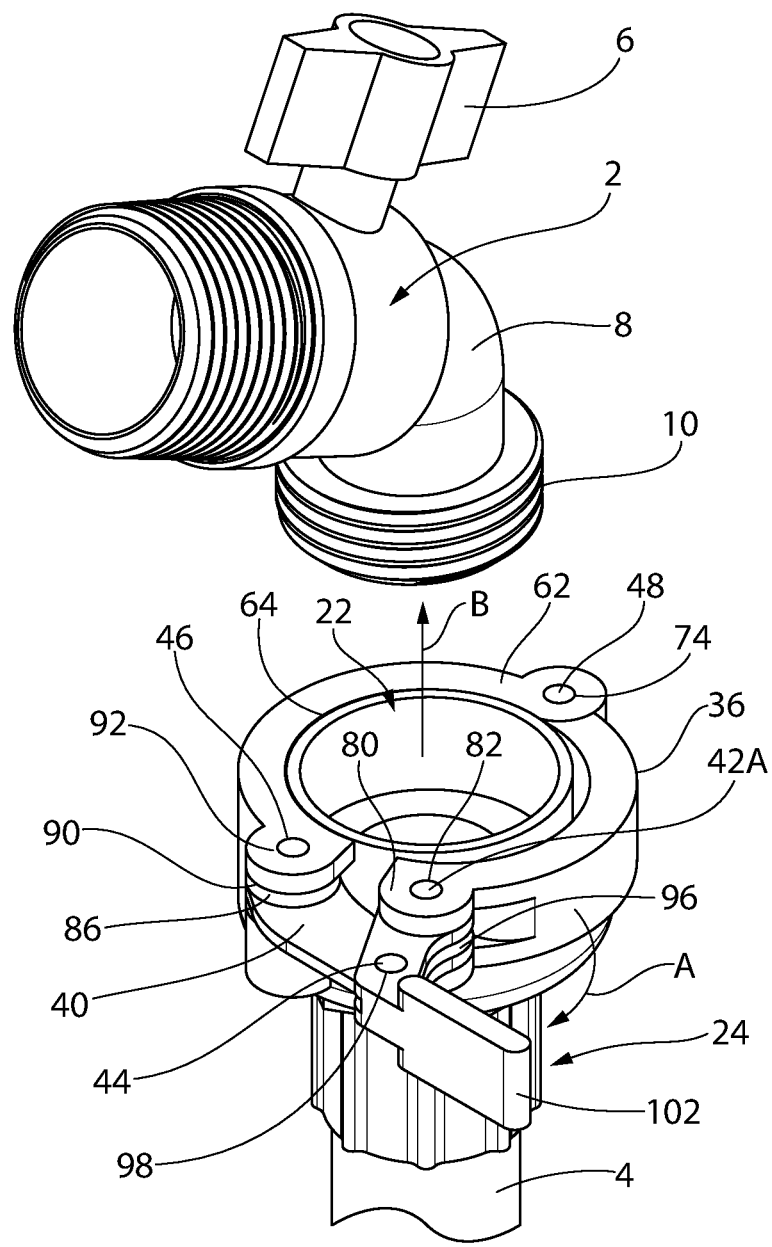
FIG. 3 is an isometric view showing the coupling device of FIG. 1 in the process of being mounted onto the externally threaded bib or spout of the faucet.

Turning now to FIG. 3 the manner of releasably mounting the coupling device 20 with its integrally connected hose 4 onto the faucet 2 will now be described. To that end, the handle 102 of the lever 38 is grasped and pivoted about the aligned axes of pivot pins 42A and 42B in the clockwise direction. That action has the effect of pivoting the link 40 with respect to the lever, whereupon the link is also pivoted in the clockwise direction, but in this case about the axis of the pivot pin 46. The pivoting of the link with respect to the lever is accomplished via the pivotable connection between those components as established by the pivot pin 44. The pivoting of the link 40 in the clockwise direction coupled with the pivoting of the lever in clockwise direction pulls on the inner end of the pressure applying member 36 to cause it pivot in the counter-clockwise direction about the pivot pin 48. The counter-clockwise pivoting of the pressure applying member 36 results in the clamp assembly being in its opened position. That action frees the elastomeric sleeve 22 from the compression force that the pressure applying member had applied on it, whereupon the elastomeric sleeve expands to its natural, unbiased (uncompressed) state, like shown in FIGS. 3 and 5.

Once the clamping assembly is in its opened state it is ready for releasable securement to the faucet's spout. To that end, the coupling device 20 and its integrally connected hose 4 is then be moved in the direction of the arrow B shown in FIG. 3 toward the externally threaded free end portion 10 of the faucet's spout until the external threads of the spout are fully within the central passageway 28 in the elastomeric sleeve. Once that has occurred, the lever 38 is pivoted in the counter-clockwise direction, whereupon the inner end of the pressure applying member is pivoted inward in the clockwise direction about the axis of the pivot pin 48. That action tightly squeezes the elastomeric sleeve between the curved interior surface 66 of the pressure applying member 36 and the curved interior surface 64 of the backing wall 62 of the housing, whereupon the helical threads of the spout dig into the inner surface of the elastomeric sleeve as described above and shown in FIGS. 1, 4 and 6. The over-center nature of the linkages provided between the components of the clamp assembly insures that the clamp assembly stays in that closed state until the lever is again pivoted in the clockwise direction to open the clamp assembly.

Turning now to FIGS. 7-8, the details of the coupling device 120 will now be described. That device is identical in construction to the coupling device 20 except for the construction of the housing. In particular, the housing 34 includes a portion (to be described immediately hereafter) for releasably securing a conventional male externally threaded connector 4A of a hose 4 thereto. In the interest of brevity the details of the construction and operation of the components and features of the coupling device 120 which are identical to the coupling device 20 will be given the same reference numbers and will not be reiterated. Thus, as can be seen the housing 34 of the coupling device 120 includes a bottom section 150 in the form of a hollow collar having internally threaded section 152 at the lower end of the central passageway 54. That internally threaded section 152 is configured to have a male externally threaded connector 4A of a hose 4 screwed therein to releasably connect the hose to the coupling device 120. The outer surface of the collar 152 at the top end 154 thereof is in the shape of the periphery of a hex head nut. That feature is provided to enable the coupling member 120 to be grasped by a wrench or some other tool, if necessary, to hold the coupling device when the male externally threaded connector 4A of the hose 4 is screwed into the threaded section 152.

As mentioned above the elastomeric sleeve and the clamping assembly forming portions of the coupling devices 20 and 120 can be used to form a cap assembly for releasable securement to the externally threaded mouth of a bottle or any other hollow vessel. Thus, attention should now be turned to FIGS. 9-11, where there is shown a bottle 12 (or other hollow vessel) having an externally threaded mouth 14 (FIG. 10) to which a cap device 220 constructed in accordance with this invention is releasably mounted to seal the mouth of the bottle or vessel. The cap device 220 is identical in most respects to the coupling devices 20 and 120, except for differences in the construction of the housing. In particular, the housing of the clamp assembly of the cap device 220 includes a cover member (to be described in detail shortly) for covering and sealing the mouth of the bottle when the cap device is in place.

Figure 9:
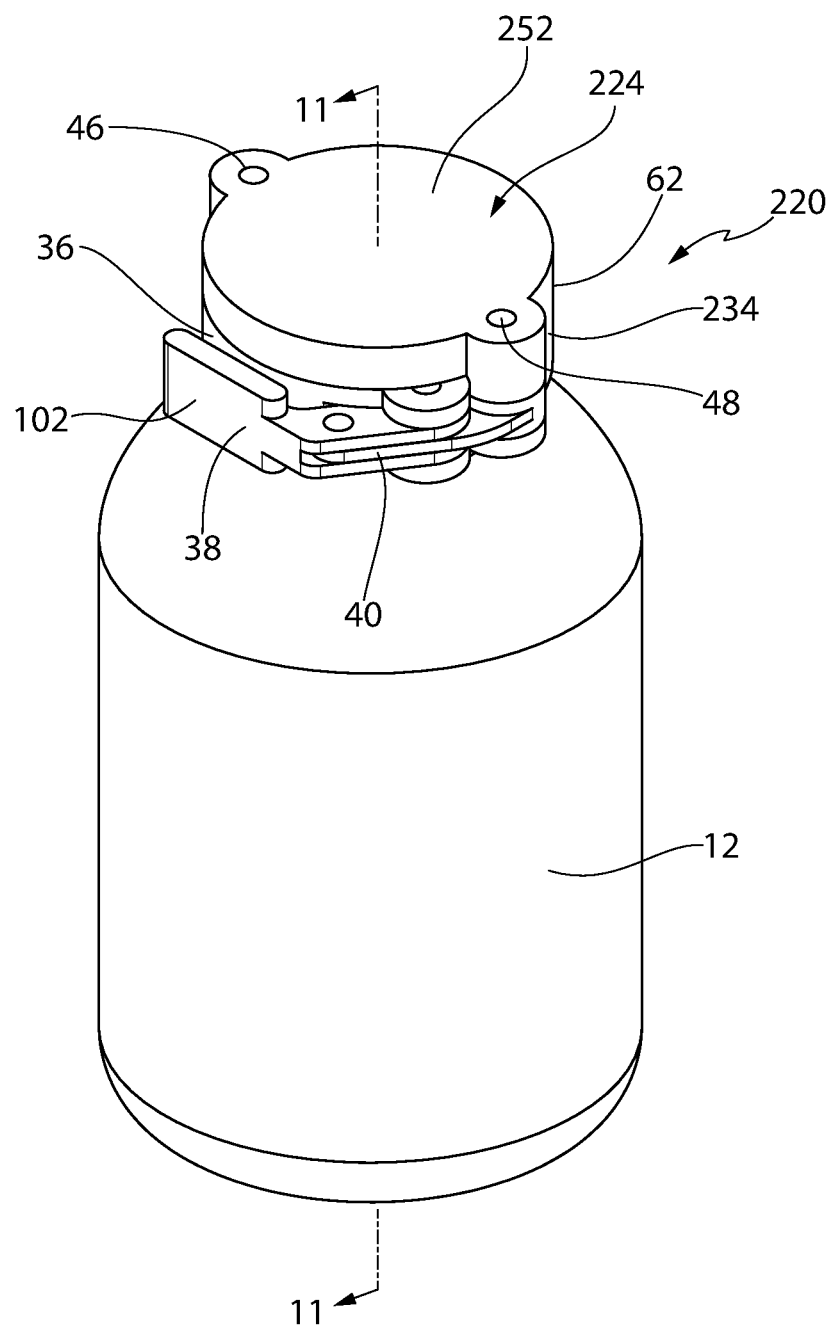
FIG. 9 is an isometric view of an exemplary embodiment of a cap device for a bottle or other vessel having an externally threaded mouth, wherein the cap device is constructed in accordance with this invention and is shown mounted onto the externally threaded mouth of the bottle.
Figure 10:
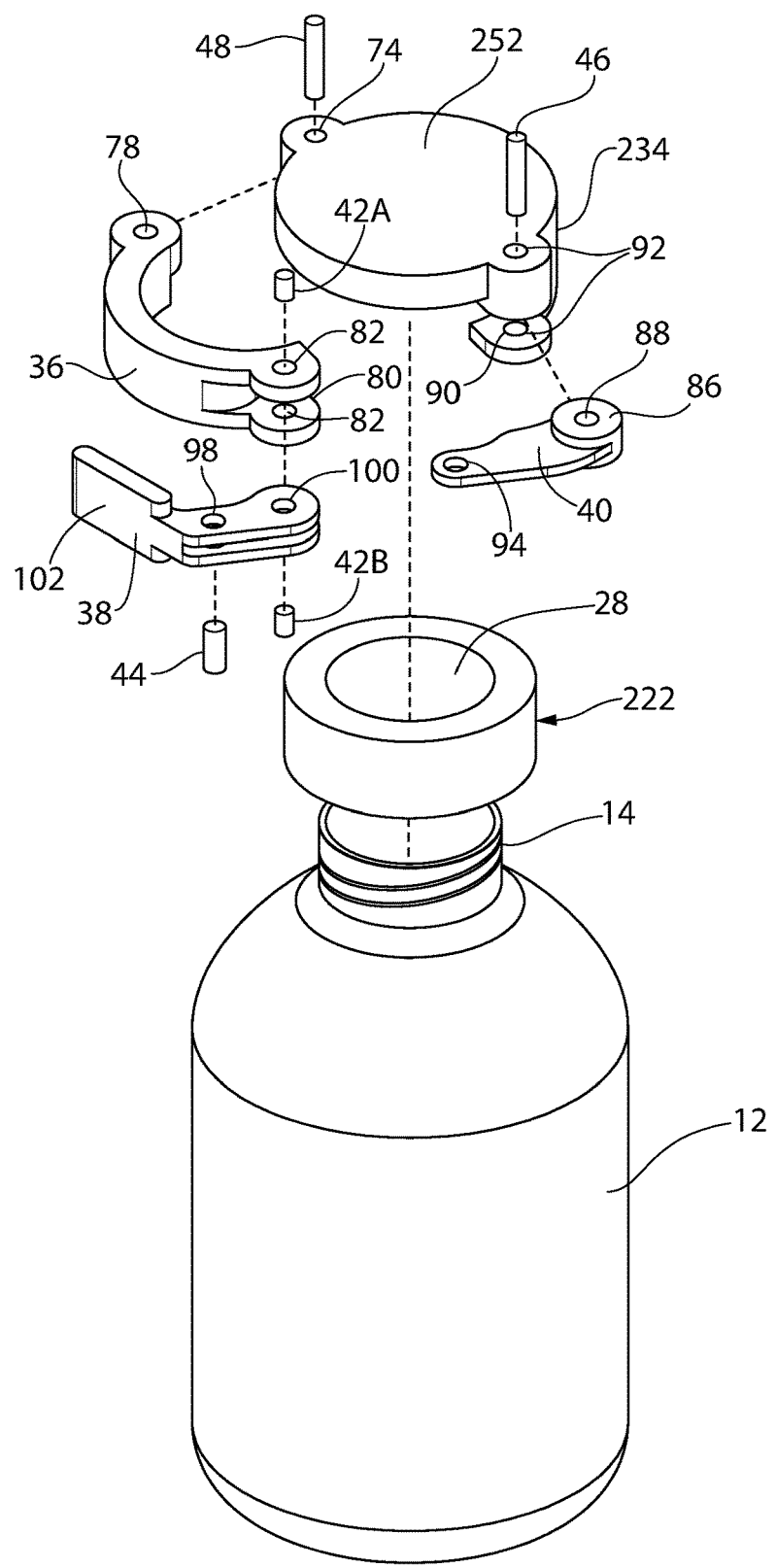
FIG. 10 is an isometric view, similar to FIG. 9, but showing the components of the cap device exploded.
Figure 11:
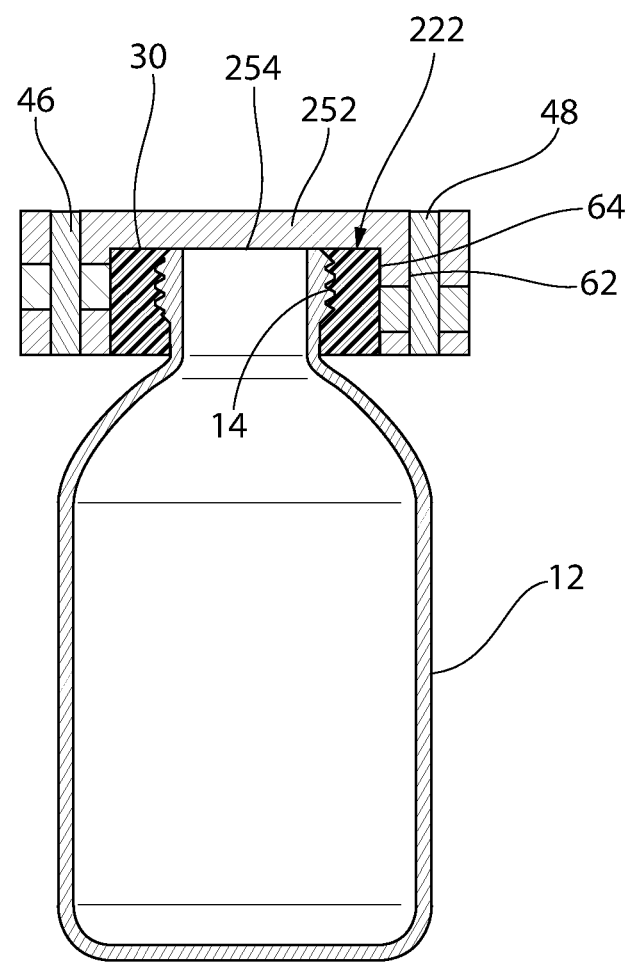
FIG. 11 is a sectional view taken along line 11-11 of FIG. 9.

In the interest of brevity the details of the construction and operation of the components and features of the cap device 220 which are identical to the coupling devices 20 and 120 will be given the same reference numbers and will not be reiterated. Thus, as can be seen of the cap device 220 comprises an elastomeric sleeve 222 (FIGS. 10 and 11) and a clamp assembly 224 (FIGS. 9-11). The elastomeric sleeve 222 is constructed similarly to the elastomeric sleeve 22, except that the sidewall of sleeve 222 is thicker (although it need not be thicker).

The clamp assembly 224 is best seen in FIGS. 10 and 11 and includes a housing 234 having an upper cover portion 252. The cover portion 252 has a circular cavity 254 (FIG. 11) in its bottom surface. The cavity 254 is constructed similar to the cavity 60. The housing 234 also includes a backing wall 62 projecting downward from the undersurface of the cover portion contiguous with the cavity 254. The backing wall has a concave interior surface 64 in the form of an arc of a circle having a predetermined radius of curvature. The height of the backing wall 62 is approximately the height of the elastomeric sleeve 222. The cavity 60 is configured for receipt of the elastomeric sleeve 222, wherein the planar top edge of the sleeve is disposed on the bottom of the cavity, with a portion of the exterior surface of the sleeve abutting the concave interior surface 64 of the backing wall 62 as best seen in FIG. 11. The sleeve 222 is preferably fixedly secured in a cavity 60, but need not be fixedly secured, so long as it is resident within that cavity such that the cover portion 252 closes off the top of the sleeve's passageway 28, and with the bottom of the passageway being open.

The pressure applying member 36 is movably, e.g., pivotably, connected to the housing 234 and located generally opposite the concave interior surface 64 of the backing wall 62. The pressure applying member 36 includes a concave interior surface 66 having a radius of curvature approximately the same as the radius of curvature of concave interior surface 64 of the backing wall. The pressure applying member is movable, e.g., pivotable, between an open position and a closed position, and vice versa, like that described with reference to the coupling devices 20 and 120.

The open bottom end of the passageway is configured to receive the external threads 14 at the mouth of the bottle 12, whereupon when the pressure applying member is pivoted to the closed position or state the concave interior surface of the pressure applying member compresses the elastomeric sleeve between it and the concave interior surface 64 of the backing wall 62 to cause the elastomeric sleeve to tightly engage the externally threads of the bottle's mouth. That action releasably secures the cap device to the bottle, with the bottom of the cavity 254 tightly engaging the planar top surface 30 of the elastomeric sleeve 223, thereby sealing the bottle. When the pressure applying member 36 is pivoted to the open position, like that described above, its concave interior surface 66 will be brought out of engagement with the portion of the elastomeric sleeve 222 disposed opposite the backing wall 62. That action enables the elastomeric sleeve to expand radially outward to its normal and uncompressed state, whereupon the external threads of the bottle's mouth will be freed from the interior surface of the sleeve so that the cap device can be removed from the bottle.

As should be appreciated by those skilled in the art, the coupling devices and the cap device as disclosed above are merely exemplary embodiments of various coupling devices or cap devices that can be constructed in accordance with this invention. For example, the coupling device may include an externally threaded male connector configured to be screwed into engagement with an internally threaded female connector secured to an end of the hose. Also as noted above the coupling device may be configured for releasable mounting onto a hose hydrant, hose bib, tap or faucet whose free end is not externally threaded, e.g., is smooth, so long as the elastomeric member when in the closed position tightly engages the outer surface of the free end of the hose hydrant, hose bib, tap or faucet to form a good fluid-tight or leak proof interface therebetween.

Without further elaboration the foregoing will so fully illustrate our invention that others may, by applying current or future knowledge, adopt the same for use under various conditions of service.

We claim:

1. A coupling device for releasably securing a hose to a faucet having a free end, said coupling device comprising:
- an elastomeric sleeve having a central passageway configured for receipt of the free end of the faucet, said elastomeric sleeve having a circular outer periphery; and
- a clamp assembly comprising;
   - a housing having a cavity including a backing wall having a concave interior surface of a mating shape to a portion of said circular outer periphery of said elastomeric sleeve, said cavity being configured for receipt of said elastomeric sleeve, wherein a portion of said circular outer periphery of said elastomeric sleeve abuts said concave interior surface of said backing wall; and
   - a pressure applying member movably connected to said housing and located generally opposite said concave interior surface of said backing wall, said pressure applying member being movable between an open position and a closed position, and vice versa, said pressure applying member having a concave interior surface of a mating shape to a portion of said circular outer periphery of said elastomeric sleeve, said concave interior surface of said pressure applying member having a length and being configured to directly engage a portion of said circular outer periphery of said elastomeric sleeve along the length of said concave interior surface of said pressure applying member to compress said elastomeric sleeve between it and said concave interior surface of said backing wall to cause said elastomeric sleeve to tightly engage said free end of the faucet when said pressure applying member is in said closed position to thereby releasably secure said clamp assembly to the faucet.

2. The coupling device of claim 1 wherein the hose is releasably secured to said coupling device.

3. The coupling device of claim 2 wherein said pressure applying member is pivotable and wherein said clamp assembly additionally comprises a lever for pivoting said pressure applying member from said open position to said closed position.

4. The coupling device of claim 2 wherein said clamp assembly comprises an assembly configured to hold said pressure applying member in said closed position against accidental movement to said open position.

5. The coupling device of claim 3 wherein said clamp assembly comprises an assembly configured to hold said pressure applying member in said closed position against accidental movement to said open position.

6. The coupling device of claim 2 wherein the hose includes an externally threaded connector and wherein said device additionally comprises an internally threaded connector for releasable receipt of said externally threaded connector of said hose.

7. The coupling device of claim 6 wherein said pressure applying member is pivotable and wherein said clamp assembly additionally comprises a lever for pivoting said pressure applying member from said open position to said closed position.

8. The coupling device of claim 6 wherein said clamp assembly comprises an assembly configured to hold said pressure applying member in said closed position against accidental movement to said open position.

9. The coupling device of claim 7 wherein said clamp assembly comprises an assembly configured to hold said pressure applying member in said closed position against accidental movement to said open position.

10. The coupling device of claim 1 wherein said free end of said faucet includes external threads and wherein said elastomeric sleeve tightly engages said free end of the faucet when said pressure applying member is in said closed position.

* * * * *